Nov. 23, 1943.　　　　C. G. STRANDLUND　　　　2,334,889
HITCH DEVICE
Filed Aug. 4, 1941　　　　2 Sheets-Sheet 1
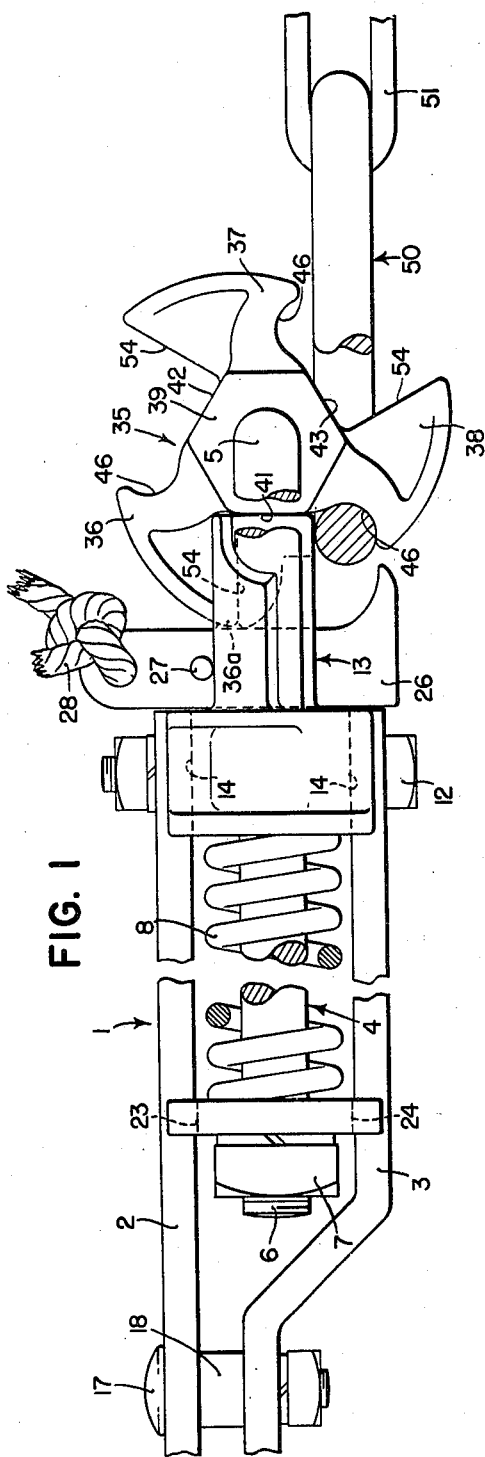
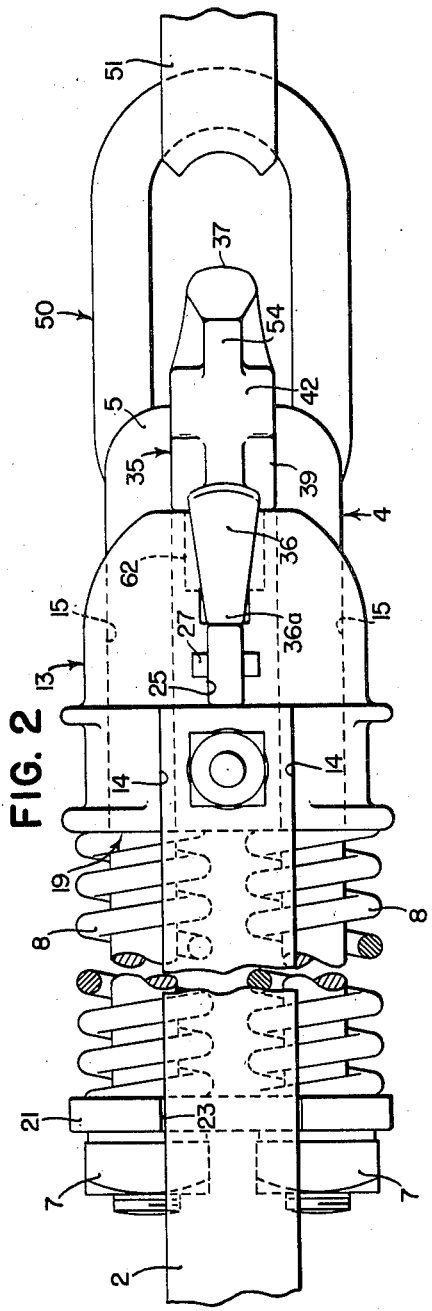
INVENTOR
CARL G. STRANDLUND
BY
ATTORNEYS Nov. 23, 1943.          C. G. STRANDLUND          2,334,889
                          HITCH DEVICE
                     Filed Aug. 4, 1941          2 Sheets-Sheet 2
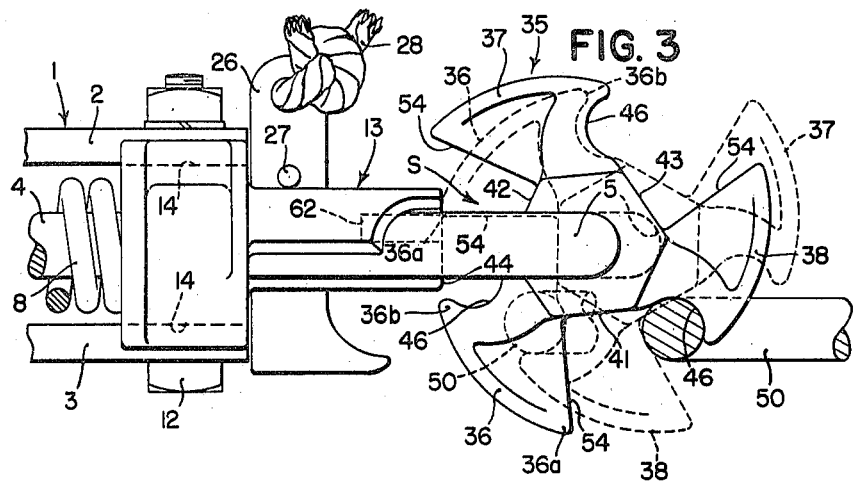
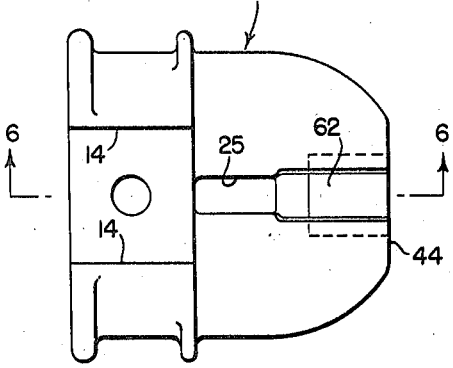
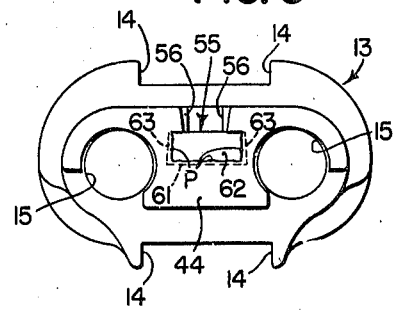
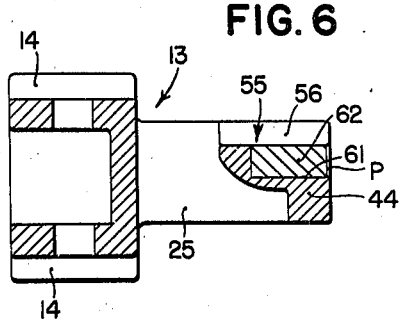
INVENTOR
CARL G. STRANDLUND
BY
ATTORNEYS Patented Nov. 23, 1943

2,334,889

UNITED STATES PATENT OFFICE 2,334,889

HITCH DEVICE

Carl G. Strandlund, Moline, Ill., assignor to Deere & Company, Moline, Ill., a corporation of Illinois Application August 4, 1941, Serial No. 405,292

6 Claims. (Cl. 280—33.16)

The present invention relates generally to agricultural implements and more particularly to releasable hitch devices such as are used for coupling agricultural implement to a propelling tractor or other source of propulsion. Particularly, the present invention is in the nature of an improvement over the spring cushioned releasable hitch device shown in my prior United States Patent No. 2,271,748, dated February 3, 1942.

The object and general nature of the present invention is the provision of a releasable hitch device of the type having a rotatable coupling member in which the latter member is so formed that after the connecting hitch member is released therefrom, the coupling member is immediately returned to an operative position without the circumferential portion of the coupling member first striking the frame member of the coupling device. Specifically, it is a feature of this invention to provide a rotatable coupling member having three lobed portions, each having a frame engaging abutment section and a hook or draft jaw section, the parts being so disposed angularly with respect to one another that the space between adjacent lobed portions is opposite the end of the frame at the moment the connecting member is released under an overload. As a result of this construction, the subsequent extension of the cushioning springs serves to draw the rotatable coupling member back against the frame without the circumferential portion of the rotatable coupling member first striking the frame. It is to be understood, however, that the present invention is not to be limited to a rotatable coupling member having any particular number of lobed portions.

Another important feature of the present invention is the provision of a coupling device of this character in which the abutment end of the frame is provided with a hardened insert or wear plate which is particularly disposed to take the wear due to the sliding action of the rotatable coupling member on the frame during the cushioning action of the springs, and it is a further feature of this invention to provide a wear plate which not only takes the wear due to the sliding action but also the wear due to the movement of the end of the coupling member abutment past the end of the frame during periods in which the coupling member is rotated into its next successive position and to release the connecting member so as to disconnect under overload conditions. Still further, it is a feature of this invention to mount the wear plate in such a manner that the impact action of the springs in returning the coupling member to its successively restored positions results in forcing a small quantity of the material of the frame abutment member over the end of the wear plate so that the latter is held in position during the life of the device but without the provision of extraneous parts, such as set screws and the like. Thus, the wear plate may be inserted into the recess receiving it by a simple press operation, since the wear plate will be retained in the recess by the aforesaid peening action.

These and other objects and advantages of the present invention will be apparent to those skilled in the art after a consideration of the following detailed description, taken in conjunction with the accompanying drawings.

In the drawings:

Figure 1 is a side elevation of a spring release coupling device embodying the principles of the present invention, certain parts thereof being broken off in order to conserve space;

Figure 2 is a plan view of the device shown in Figure 1;

Figure 3 is a fragmentary view, similar to Figure 1, showing the position of the rotatable coupling member after the connecting hitch member has been released therefrom but before the springs have completely restored the rotatable coupling member to its normal draft receiving position;

Figure 4 is a plan view of the abutment member that constitutes a part of the frame of the device;

Figure 5 is an end view of the abutment member shown in Figure 4; and

Figure 6 is a section taken generally along the line 6—6 of Figure 4.

Referring now to the drawings, and more particularly to Figures 1-3, inclusive, my improved hitch or coupling device is similar to that disclosed and claimed in my prior patent, mentioned above, to which reference may be had if necessary. The coupling or spring cushion release hitch of the present invention embodies a frame 1 which includes a pair of vertically spaced longitudinally extending bars 2 and 3 which are spaced apart at their forward ends and receive a slidable draft bolt 4, preferably a U-shaped member having an intermediate bight portion 5 and rear threaded ends 6 upon which nuts 7 are placed. A pair of compression springs 8 are also disposed between the forward ends of the frame bars 2 and 3. The forward ends of the latter are joined together by a bolt 12 which also secures a casting in the form of a block or abutment member 13. The rear end of the latter is formed with channels 14 to receive the forward ends of the straps 2 and 9. Also, the coupling abutment member 13 is provided with parallel longitudinally extending openings 15 through which the ends of the U-shaped draft bolt 4 are slidable. The rear or parallel portions of the frame members 2 and 3 are connected by bolts 17 on which suitable spacers 18 are disposed. The springs 8 are disposed between the rear face 19 (Figure 2) of the abutment member 13 and a guide plate 21 which is apertured to receive the threaded ends 6 of the U-shaped draft bolt or plunger 4, the guide plate 21 also having upper and lower recesses 23 and 24 which receive the forward ends of the frame bars or stop members 2 and 3. The forward or nose portion of the abutment member 13 is provided with a transverse opening 25 in which a vertically slidable link 26 is disposed. The upper end of the link is apertured to receive a stop pin 27 and also a cable 28 which serves as means for controlling the vertically slidable link 26.

Mounted for rotation on the bight portion of the slidable draft bolt or plunger 4 is a rotatable coupling member 35 having three lobes 36, 37 and 38, which are formed integral with the hub portion 39, the latter having three faces 41, 42 and 43 which are adapted to be disposed substantially flat against the abutment end or nose 44 of the member 13. Each of the lobes 36, 37 and 38 is provided with a draft jaw or hook section 46 that is adapted to receive the rear end of a draft transmitting link 50 which serves to connect a clevis 51, suitably connected to the drawbar of a tractor or the like, to the spring cushion release hitch unit 1. Also, each of the lobes 36, 37 and 38 is provided with an abutment shoulder or edge 54, the edges being adapted successively to be disposed against an abutment face 55 on the forward or abutment end of the member 13, the abutment face 55 lying in the bottom of a recessed portion 56 of the member 13 (Figure 6). This portion of the casting member 13 is provided with a recess 61 in which a steel insert 62 is disposed. As best shown in Figure 5, the walls 63 of the recess 61 are slightly convergent for the purpose of facilitating the casting or forming of the member 13, and the steel insert 62 is of corresponding configuration. The length of the steel insert 62 is slightly less than the length of the corresponding recess 61 for a purpose which will be explained below.

The operation of the spring cushion release device described above is substantially as follows.

The part 50 (Figure 1) is normally carried by the tractor, and the latter may be hitched to the implement to which the unit is attached in any suitable manner, preferably by backing the tractor into position, and then using the cable 28 to lift the latch 26 into an upward position, relative to the abutment member 13, after which the cable 28 can be used to manipulate the hitch member 1 into a position to dispose the hook portion 46 of the rotatable coupling member 35 in the rear portion of the ring 50. The force of the springs 8 normally hold the slidable draft bolt 4 in a rearward position with the coupling member 35 firmly against the front end of the abutment member 13, which is the position shown in Figure 1. In this figure it will be noticed that the shouldered section 41 of the hub 39 is flat against the end of the abutment member 13 and that the edge 54 of the lobs 36 is disposed flat against the abutment face 55. After the rear end of the ring 50 seats in the hook portion 46, the cable 28 may be released and the link 26 will then return to the position shown in Figure 1, locking the ring 50 in place and preventing it from dropping out of position. If desired, the tractor may be backed, which will back the implement since the link 26 will receive the rearward thrust transmitted through the link 50 to the hitch member 1. The ring 50 is held extended in more or less rigid relation relative to the tractor-carried clevis 51, due to the cooperating curvature of the engaged portions (Figure 2) of the parts 50 and 51.

If the load becomes excessive, exceeding the strength of the springs 8, the latter yield, which permits the slidable draft bolt 4 to move forwardly, and the continued pull of the link 50 on the rotatable coupling member 35 causes the edge 54 of the lobe 36, in the position shown in Figure 1, to slide along the abutment face 55. If the abnormal loading is not too great, the springs 8 serve merely to cushion the transmission of such forces but do not yield enough to permit the nose 36a of the lobe 36 to disengage from the abutment face 55, the shoulder 54 sliding back and forth on the face 55. Disengagement will occur if the abnormal load reaches a predetermined degree. However, if the load exceeds a predetermined degree, depending upon the adjustment of the nuts 7, disengagement will occur by the springs 8 yielding and permitting the draft bolt 4 to be drawn forwardly or outwardly until the nose 36a rides off of the abutment surface 55, as shown in dotted lines in Figure 3, which permits the coupling member 35 to rotate in a counterclockwise direction. The draft jaws 46 are so shaped, and the angular relation of the parts is such, that the connecting link 50 remains in engagement with the draft jaw 46 (of the lobe 38 in Figure 3) until the draft force has pulled the rotatable coupling member around to the position shown in full lines in Figure 3, at which point the heel 36b of the lobe 36 moves past the lower edge of the end 44 of the frame 13 so that the space S between lobes 36 and 37 is directly opposite the end of the frame 13. The springs 8 then are free to expand to retract the member 4 and the draft link 50 now moves forward out of the jaw 46, the coupling member 35 swinging slightly, more or less about the rear end of the link 50 as a center. As the draft bolt 4 is retracted, the hub face 42 of the rotatable coupling 35 is pulled back against the end 44 of the frame 13, which positions the abutment edge 54 of the next succeeding lobe 37 against the face 55 and the next draft jaw in draft-receiving position.

The hardened steel insert 62 takes substantially all of the wear that occurs during the time the draft pull causes the springs 8 to yield, which results in sliding of the shoulder 54 along the surface 55. Also, the hardened steel insert 62 takes the wear of the nose portion of each of the lobes at the moment the coupling member 35 is pulled outwardly by an abnormal load sufficient to clear the edge of the steel insert 62. When the draft link 50 is released, the parts are restored with considerable force, which results in the member 35 striking the end of the member 13 with considerable impact. In the present invention this action is taken advantage of in that the steel insert 62, being slightly shorter than the recess 61, the impact blows of the member 35 on the member 13 cause the metal of the casting member 13 to be peened over the end of the steel insert 62, which holds the latter in place against any tendency to slide out of the recess 61 when the springs yield and permit the draft pull to pull the member 35 outwardly relative to the abutment member 13. The peened portions are indicated by the reference character P.

This action is possible because the angle of the hook portions 46 is such that the member 50 slips out of the member 35 at a time when the end of the abutment member 13 is opposite the space between adjacent lobe members generally opposite the hook portion that was engaged with the hitch or connecting member 50. Hence, as soon as the latter member is released, the springs 8 immediately return the draft bolt 4 and the coupling member 35 to the position shown in Figure 1. Thus, the member 35 is drawn directly back against the end of the member 13 without interference, as by circumferential portions of the lobe sections striking the end of the frame first.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A draft coupling adapted to be connected with a connecting member, comprising a frame, a part movable generally longitudinally relative to said frame, a rotatable coupling member on said part and having a plurality of spaced apart lobe portions, each having a hook section adapted to receive said connecting member and an abutment section adapted to engage the end of said frame, and resilient means opposing movement of said part and serving to hold said coupling member up against the end of said frame, each of said hook sections being formed so that, upon the occurrence of an overload sufficient to release said coupling member for rotation, said connecting member is released from said coupling member at a point when a space between adjacent lobe portions is opposite the end of said frame, whereby after the release of said connecting member said resilient member retracts said part and brings said rotatable coupling member up against the end of said frame with an abutment section in a position to engage said frame and prevent rotation of said coupling member.

2. A draft coupling adapted to be connected with a connecting member, comprising a frame, a part movable generally longitudinally relative to said frame, a rotatable coupling member on said part and having spaced apart lobe portions each having a hook section adapted to receive said connecting member and an abutment section adapted to engage the end of said frame, and resilient means opposing movement of said part and serving to hold said coupling member up against the end of said frame, the angular disposition of said hook sections and the space between adjacent lobe portions being such that said connecting member is pulled away from a hook section, upon the occurrence of an overload, at a point in the rotation of the rotatable coupling member when the space between the next succeeding lobe portions is opposite the end of said frame, whereby said rotatable coupling member is free to be moved by said resilient means back into a position in which the next succeeding abutment section overlies the adjacent end of the frame.

3. A draft coupling adapted to be connected with a connecting member, comprising a frame, a part movable generally longitudinally relative to said frame, a rotatable coupling member on said part and having a plurality of spaced apart lobe portions, each having a hook section adapted to receive said connecting member and an abutment section adapted to engage the end of said frame, and resilient means opposing movement of said part and serving to hold said coupling member up against the end of said frame, said lobe portions being formed and spaced so that said connecting member is released from the hook section of the associated lobe portion after the next succeeding lobe portion is moved past the frame by the pull of the connecting member on the rotatable coupling member but before the following lobe portion reaches a position adjacent said frame.

4. A draft coupling adapted to be connected with a connecting member, comprising a frame, a part movable relative to the frame, resilient means yieldingly opposing movement of said part relative to the frame, a rotatable coupling member on said part and having a hub portion and a plurality of lobe sections, each of the latter having a hook portion adapted to be releasably engaged with said connecting member and an abutment section adapted to engage an end portion of said frame so as to hold the rotatable coupling member against rotation until said part has been moved an amount relative to the frame sufficient to cause said abutment section to separate from said portion of the frame, thereby permitting said coupling member to rotate and release the connecting member from the associated hook portion, the angular disposition of each of said hook portions and the associated succeeding lobe section being such that upon the release of the connecting member from a hook portion the coupling member is returned by said resilient means to a position with the hub portion of the coupling member and said abutment section against said end portion of the frame.

5. In a coupling device, an abutment member, a rotatable coupling member having a hub portion normally held against the end of said abutment member, a draft-receiving jaw and an abutment adapted to slidably engage said abutment member and to rotate past the end of the abutment member upon the occurrence of a predetermined amount of sliding movement of said coupling member relative to said abutment member, resilient means acting against said coupling member to yieldingly oppose said sliding movement and to return said rotatable coupling member to a position with its hub portion against the end of said abutment member, said abutment member having a recess extending generally in the direction of sliding movement of said abutment relative to said abutment member and open at its upper side and at its outer end, and a hardened insert disposed in said recess with its upper face and outer end exposed to be engaged by said coupling member abutment during sliding and release of said coupling member by yielding of said resilient means, said recess being slightly longer than said insert, whereby the return of said coupling member by said resilient means causes the hub portion to strike the end of said abutment member and force the material of the latter over the end of said hardened insert, thereby holding the latter in said recess.

6. In a draft coupling, a frame including a member having a recess open at one side and one end and having a length slightly less than the length of said recess, a hardened insert therein, a part slidably engaging the exposed side of said insert, resilient means yieldingly opposing outward movement of said part and adapted to return said part to a retracted position, relative to said frame, upon the removal of the force causing outward movement of said part, and means on said part adapted to engage the end of said frame member adjacent the end of the recess therein so as to work the material of said frame member over the end of said insert during use, thereby serving to prevent outward movement of said insert in said recess during outward sliding movement of said part.

CARL G. STRANDLUND.